United States Patent
Prokhorov (10) Patent No.: US 9,908,425 B2
(45) Date of Patent: Mar. 6, 2018

(54) LOCATING AND ALIGNING WIRELESS CHARGING ELEMENTS FOR ELECTRIC VEHICLES

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 229 days.

(21) Appl. No.: 14/789,010

(22) Filed: Jul. 1, 2015

(65) Prior Publication Data

US 2017/0001527 A1    Jan. 5, 2017

(51) Int. Cl.
*B60L 11/18* (2006.01)

(52) U.S. Cl.
CPC ......... *B60L 11/182* (2013.01); *B60L 11/1833* (2013.01); *B60L 11/1835* (2013.01); *B60L 11/1846* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .................................................. B60L 11/182
USPC ......................................................... 320/108
See application file for complete search history.

(56) References Cited

U.S. PATENT DOCUMENTS

| 7,926,598 | B2 | 4/2011 | Rudakevych | |
|---|---|---|---|---|
| 8,825,371 | B2 | 9/2014 | Prokhorov et al. | |
| 8,910,342 | B2 | 12/2014 | Gilbert, Jr. et al. | |
| 8,975,864 | B2* | 3/2015 | Kim | B60L 11/182 320/108 |
| 9,698,607 | B2* | 7/2017 | Kesler | B60L 11/182 |
| 2009/0185036 | A1* | 7/2009 | Bowron | G08B 13/19632 348/151 |
| 2010/0235006 | A1* | 9/2010 | Brown | B60L 11/182 700/286 |
| 2013/0057082 | A1* | 3/2013 | Takada | B60L 11/182 307/104 |

(Continued)

FOREIGN PATENT DOCUMENTS

EP    2684733 A1    1/2014

*Primary Examiner* — Drew A Dunn
*Assistant Examiner* — Jerry D Robbins
(74) *Attorney, Agent, or Firm* — Christopher G. Darrow; Darrow Mustafa PC (57) ABSTRACT

Arrangements directed to the wireless charging of a battery, particularly a battery for an electric or hybrid electric vehicle, are described. A wireless charging system can includes a charging station and a charge receiver. The charge receiver can be provided on a vehicle. The charging station can include a movable charge transmitter. The system includes a sensor that can detect a relative position of the charge receiver. The system can include a processor operatively connected to the charge transmitter. The processor can cause the position of the charge transmitter to be adjusted within the housing based on a relative location of a charge receiver such that the charge transmitter and charge receiver are in substantial charging alignment.

15 Claims, 5 Drawing Sheets

(56) References Cited

U.S. PATENT DOCUMENTS

| | | | |
|---|---|---|---|
| 2014/0217966 A1* | 8/2014 | Schneider | B60L 11/1829 320/108 |
| 2015/0214751 A1* | 7/2015 | Niizuma | B60L 11/182 307/9.1 |
| 2016/0052415 A1* | 2/2016 | Bell | H02J 50/80 320/108 |

* cited by examiner

LOCATING AND ALIGNING WIRELESS CHARGING ELEMENTS FOR ELECTRIC VEHICLES

FIELD

The present disclosure relates in general to wirelessly charging a power source and, more particularly, to wirelessly charging electrically-powered vehicles.

BACKGROUND

There is a shift in vehicle technology from vehicles with gas-powered engines to electric vehicles. Electric and hybrid electric vehicles use one or more electric motors for propulsion. Such motors are powered by one or more rechargeable batteries. The charging of the batteries is a new task for drivers. Some electric vehicles can be charged by being plugged into an external source of electricity, such as a wall outlet. Some electric vehicles can be charged wirelessly. Some wireless charging systems require a driver to park the vehicle in a charging station such that a charge receiver on the vehicle is aligned with a charge transmitter at the charging station.

SUMMARY

In one respect, the present disclosure is directed to a vehicle charging station. The vehicle charging station can include a housing. The vehicle charging station can also include a charge transmitter. The charge transmitter can be movable within a range of motion. The range of motion can be physically constrained by the housing. The vehicle charging station can also include a processor. The processor can be operatively connected to the charge transmitter. The processor can be configured to cause the position of the charge transmitter to be adjusted within the housing. The adjustment of the position can be based on a relative location of a charge receiver such that the charge transmitter and charge receiver are in substantial charging alignment.

In another respect, the present disclosure is directed to a system for wirelessly charging a vehicle. The system includes a charge receiver and a charging station. The charging station can include a housing. The charging station can also include a movable charge transmitter. The charging station can further include a sensor. The sensor can be configured to detect and communicate data relating to a presence of the charge receiver or a relative location of the charge receiver. The charging station can further include a processor. The processor can be operatively connected to receive data from the sensor. The processor can be operatively connected to the movable charge transmitter to cause the position of the charge transmitter to be adjusted within the housing based on a relative location of the charge receiver to achieve substantial charging alignment between the charge transmitter and charge receiver.

In still another respect, the present disclosure is directed to a method of wirelessly charging a vehicle. The method can include determining a position of a charge receiver. The method can include adjusting the position of a charge transmitter located within a housing based on the determined position of the charge receiver. The movement of the charge transmitter can be constrained by the housing. The method can also include activating the charge transmitter to transmit an electromagnetic field at least partially toward the charge receiver.

DETAILED DESCRIPTION

The present disclosure is directed to wirelessly charging a power source for a vehicle. Such wireless charging can occur at a charging station. The charging station can includes a charge transmitter. The charge transmitter can be movable within a range of motion. The range of motion of the charge transmitter can be physically constrained by a housing. The housing can be located above ground level or below ground level. The charging station can include a processor operatively connected to the charge transmitter. The processor can be configured to cause the position of the charge transmitter to be adjusted within the housing based on a relative location of a charge receiver such that the charge transmitter and charge receiver are in substantial charging alignment.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
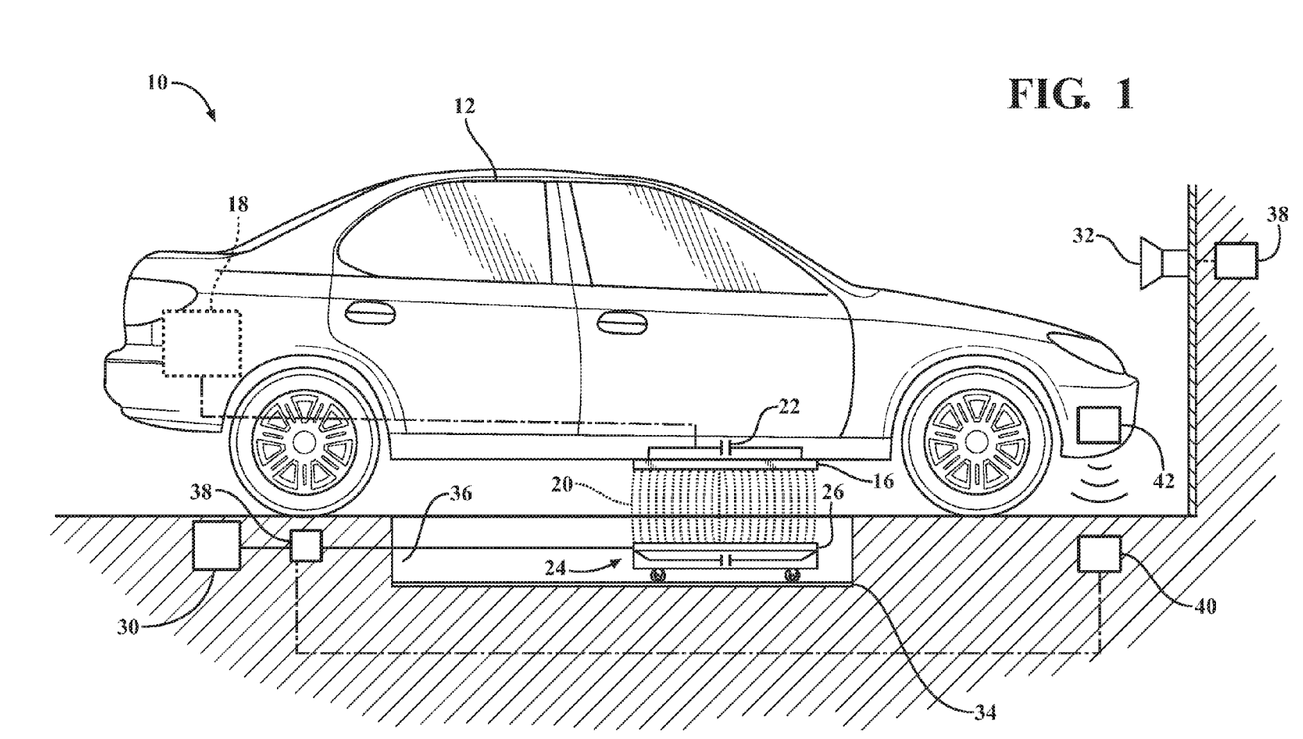
FIG. 1 is a view of an example of a charging system.
Figure 2:
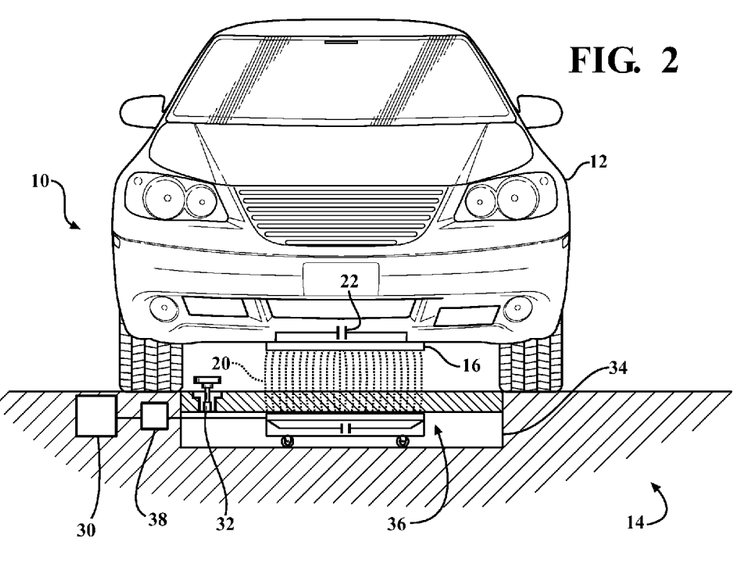
FIG. 2 is another view of the charging system of FIG. 1.

Referring now to FIGS. 1 and 2, an example of a charging system 10 is shown. The charging system 10 can include a vehicle 12 and a charging station 14. Each of these elements will be described in turn below.

The vehicle 12 can be any suitable type of vehicle. As used herein, "vehicle" means any form of transport that is at least partially motorized. In one or more implementations, the vehicle 12 can be an automobile. While arrangements will be described herein with respect to automobiles, it will be understood that embodiments are not limited to automobiles. In one or more implementations, the vehicle 12 can be a watercraft, an aircraft, a space craft, a golf cart, a motorcycle, and/or any other form of motorized transport. In one or more arrangements, the vehicle 12 can be a battery electric vehicle, a plug-in hybrid electric vehicle, or any other form of electric vehicle.

Further, it should be noted that the arrangements described herein can be used in one or more non-vehicular applications. For instance, arrangements described herein can be used in connection with other devices capable of being charged wirelessly, such as a mobile device (e.g., cell phone or smart phone, tablet computer, laptop, etc.).

The vehicle 12 can include various elements. Some of the possible elements of the vehicle 12 are shown in FIG. 1 and will now be described. It will be understood that it is not necessary for the vehicle 12 to have all of the elements shown in FIGS. 1 and 2 or described herein. The vehicle 12 can have any combination of the various elements shown in FIGS. 1-2. Further, the vehicle 12 can have additional elements to those shown in FIG. 2. In some arrangements, vehicle 12 may not include one or more of the elements shown in FIGS. 1-2. Further, while the various elements are shown as being located within the vehicle 12 in FIGS. 1-2, it will be understood that one or more of these elements can be located external to the vehicle 12. Further, the elements shown can be physically separated by large distances.

The vehicle 12 can include a charge receiver 16 and a battery 18. Although the battery 18 is disclosed as an example, it should be understood that the battery can be any power source capable of energizing and/or configured to energize an electric motor. The charge receiver 16 can be operatively connected to supply electrical energy to the battery 18. The term "operatively connected," as used throughout this description, can include direct or indirect connections, including connections without direct physical contact.

The vehicle 12 can also include protective circuitry (not shown) operatively connected between the charge receiver 16 and the battery 18. Such protective circuitry can prevent the battery 18 from overcharging, short-circuiting, and/or any other problems that can arise during charging. The vehicle 12 can also include current, voltage, power, and/or efficiency testing circuitry (not shown) operatively connected between the charge receiver 16 and battery 18. "Charge receiver" is defined as a component or group of components configured to receive an electromagnetic field from an electromagnetic energy source for purposes of charging a battery. In one or more arrangements, the charge receiver 16 can be a coil, a solenoid, an induction pad, and/or a resonator. In one or more arrangements, the charge receiver 16 can be any suitable inductive device capable of receiving an electromagnetic field 20 for purposes of charging the battery 18.

The charge receiver 16 can be configured to be movable. For example, the charge receiver 16 can be configured to be movable relative to the charging station 14. In the arrangements shown and described herein, the charge receiver 16 can be movable relative to the charging station 14 because it is attached to, connected to, and/or mounted on the vehicle 12 in any suitable location. In one or more arrangements, the charger receiver 16 can be attached to, connected to, and/or mounted on an underside portion of the vehicle, as is shown in FIGS. 1 and 2. However, it should be understood that the charge receiver 16 can be mounted on any movable device, component, or machinery that has a battery that can be electrically charged.

The vehicle 12 can include at least one capacitive element 22, such as a capacitor or variable capacitor. In one or more arrangements, the capacitive element 22 can be operatively connected to the charge receiver 16 to form an L-C circuit. For instance, the capacitive element 22 can be operatively connected in series or in parallel with the charge receiver 16. The capacitive element 22 and the charge receiver 16 can be operatively connected to the battery 18.

The battery 18 can be any component or group of components configured to receive and store electrical energy for consumption. Any suitable type of battery can be used. For example, the battery 18 can be a lead-acid battery, a nickel-metal hybride battery, lithium ion battery, or any other kind of battery that can be used to power the vehicle 12.

The charging station 14 can include a charge transmitter 26. "Charge transmitter" is defined as any component or group of components configured to transmit an electromagnetic field, which can be used for purposes of charging the battery. The charge transmitter 26 can be any suitable electromagnetic energy source. In one or more arrangements, the charge transmitter 26 can be a coil, a solenoid, an induction pad, and/or a resonator. The charge transmitter 26 can also include at least one capacitive element 28. The capacitive element 28 can be, for example, a capacitor or a variable capacitor. In one or more arrangements, the capacitive element 28 can be operatively connected to the charge transmitter 26 to form an L-C circuit. For instance, the capacitive element 28 can be operatively connected in series or in parallel to the charge transmitter 26 to form an L-C circuit.

The charge transmitter 26 can be operatively connected to a power source 30. The power source 30 can be an AC power source or a DC power source. The power source 30 can receive electrical energy from any suitable source, including, for example, an electrical power grid, a combustible engine generator, chemical energy, solar energy, and/or any other energy source that can power the charge transmitter 26.

In one or more arrangements, the charge transmitter 26 can be movable. The movement of the charge transmitter 26 can be achieved in any suitable manner. In one or more arrangements, the charge transmitter 26 can be provided on a movable cart 24. While arrangements described herein will be presented in connection with a movable cart, it will be understood that the present application is not limited to a cart. Indeed, the charge transmitter 26 can be movable in any suitable manner. "Movable cart" means any structure that includes a plurality of wheels and/or other elements that enable or facilitate movement of the structure on a surface. The moveable cart 24 can have any suitable form. In one or more arrangements, the movable cart 24 can generally be similar in design and/or operation to a small robotic autonomous vacuum cleaner. One example of such a vacuum cleaner of which is described in U.S. Pat. No. 8,910,342, which is incorporated herein by reference. Another example of a movable cart 24 is a small robotic vehicle described in U.S. Pat. No. 7,926,598, which is incorporated herein by reference.

Figure 5:
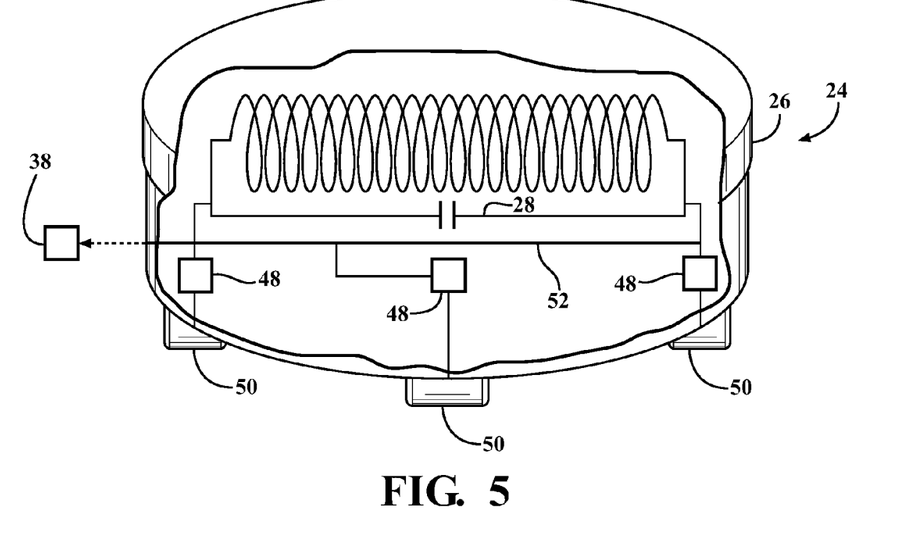
FIG. 5 is a view of an example of a movable charge transmitter for a charging system.

Referring now to FIG. 5, one example of the movable cart 24 is shown. The movable cart 24 can include the charge transmitter 26. The moveable cart 24 can include a capacitive element 28, at least one motor 48, and at least two wheels 50. While FIG. 5 shows the movable cart 24 as having three wheels 50 and three motors 48 driving those three wheels 50, the movable cart 24 is not limited to having all of such elements or such quantity of each element. The movable cart 24 can have any suitable configuration. The moveable cart 24 can be operatively connected to a processor 38. The movement of the movable cart 24 can be controlled by the processor 38.

The at least one motor 48 can be any suitable type of motor. For instance, the motor 48 can be a brushless DC motor, step DC motor, an AC motor, induction motor, and/or any other motor generally used to propel, drive, actuate, or move a small robot. The wheels 50 can be made of any suitable material. For instance, the wheels 50 can be made of rubber, plastic, foam, and/or any other material generally used for wheels. Additionally, the wheels 50 can be standard wheels, caster wheels, multidirectional roller wheels, or omni-wheels, just to name a few possibilities. The wheels 50 can be any type of wheel generally used in small robotics.

The at least one motor 48 and the L-C circuit of the movable cart 24 can be operatively connected to the processor 38 in any suitable manner. For instance, in one or more arrangements, the at least one motor 48 and the L-C circuit of the movable cart 24 can be operatively connected to the processor 38 via bus 52. Alternatively, the at least one motor 48 can wirelessly communicate with the processor 38. The power for the charge transmitter can be supplied directly from the power source 30 or from the processor 38. The wireless communication between the at least one motor 48 and the processor 38 may be provided by Wi-Fi technology, Bluetooth technology, RFID technology, beacon technology, or any other type of wireless communication technology, now known or later developed.

It should be noted that, although shown in FIG. 1 as being below ground level, the processor 38 and/or the power source 30 can be provided in any suitable location. For instance, the processor 38 and/or the power source 30 can be provided in the housing 34, on the ground, or elsewhere within the charging system 10.

Additionally, the movable cart 24 can include one or more sensors (not shown). "Sensor" means any device, component, and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

The one or more sensors can be positioned in any suitable location on the movable cart 24. For example, one or more sensors can be provided on an exterior surface of the movable cart 24. The sensors can be any suitable type(s) of sensors, including, for example, proximity sensors and/or pressure sensors. The sensors can be used to detect physical barrier within the housing 34 to prevent the movable cart 24 from physically contacting interior walls of the housing 34 and/or to minimize the force at which the movable cart 24 contacts the interior walls, thereby avoiding or minimizing damage sustainable to the movable cart 24. In arrangements in which there are a plurality of sensors, the sensors can work independently from each other. Alternatively, two or more of the sensors can work in combination with each other. In such case, the two or more sensors can form a sensor network.

The at least one sensor can be operatively connected to one or more elements of the system 10, including, for example, the processor 38 and/or the power source 30. The charging station 14 can also include at least one sensor 32. In arrangements in which there are a plurality of sensors 32, the sensors 32 can work independently from each other. Alternatively, two or more of the sensors 32 can work in combination with each other. In such case, the two or more sensors 32 can form a sensor network. The at least one sensor 32 can be operatively connected to one or more elements of the charging station 14, such as the processor 38 and/or the power source 30.

The sensor 32 can be any suitable type of sensor. In one or more arrangements, the sensor 32 can be a camera sensor, an infrared sensor, a radar sensor, a lidar sensor, and/or any other sensor configured to detect the presence of and/or the location of the charge receiver 16 when the charge receiver 16 is present at the charging station 14. In another arrangement, the sensor 32 can be a sensor array.

The one or more sensors 32 can be positioned in any suitable location in the charging station 14. As shown in FIG. 1, in one example, the sensor 32 can be mounted in front of the vehicle 12. The charging system 10 can also include a reference point (not shown) mounted, suspended, or positioned anywhere throughout the charging system 10 that is identifiable and/or detectable by the sensor 32. Thus, when the vehicle 12 parks at the charging station 14, the camera sensor 32 can capture an image of the vehicle 12 including the reference point. An image processor (not shown) can use the image to compare the location of the vehicle 12 to the reference point and obtain spatial relationships of the vehicle 12 to the sensor 32 and to the charging station 14.

As noted above, a plurality of sensors 32 can be used. The sensors 32 can be the same type of sensor, or one or more of the plurality of sensors 32 can be a different type than the other sensors. As shown in FIG. 2, one sensor 32 can be an infrared sensor, and another sensor 32 can be a pneumatically actuated camera sensor. "Pneumatically actuated camera sensor" as used herein means a camera that is actuated to elevate above ground level and capture an image of the area above ground. The pneumatically actuated camera sensor can be configured to rotate about its vertical axis. The infrared sensor can be mounted on a parking sign, a wall, on the ground, ceiling, or anywhere else throughout the charging system 10. The infrared sensor can detect a heat signature from many different components of the vehicle 12, including the battery 18, the charge receiver 16, or any other parts or components that are identifiable on the vehicle 12 by an infrared sensor. "Heat signature" as used herein means any temperature or change in temperature identifiable by an infrared sensor that is indicative of the presence of a vehicle that has been recently operated. For example, when an electric vehicle has recently been driven, electric motors displaced therein may have an associated heat signature because the electric motors have recently been used. Also, the batteries in an electric vehicle may also have associated heat signatures because they have recently discharged energy stored to operate the electric motors.

When the infrared sensor detects the presence of the vehicle 12, the pneumatically actuated camera sensor extends out of the ground in any suitable manner. For instance, the pneumatically actuated camera sensor can be extended telescopically. The pneumatically actuated camera sensor rotates around and captures images of the underside of the vehicle 12. An image processor (not shown) can determine a relative position of the charge receiver 16 to the sensor 32. Based on this information, the relative position of the charge transmitter 26 to the charge receiver 16 can be determined.

Again, it will be understood that the above manners of determining a relative location between the charge transmitter 26 and the charge receiver 16 are merely provided as examples. Arrangements are not limited to the particular manner described. Indeed, any suitable manner of determining the relative location between the charge transmitter 26 and the charge receiver 16 can be used.

Figure 3:
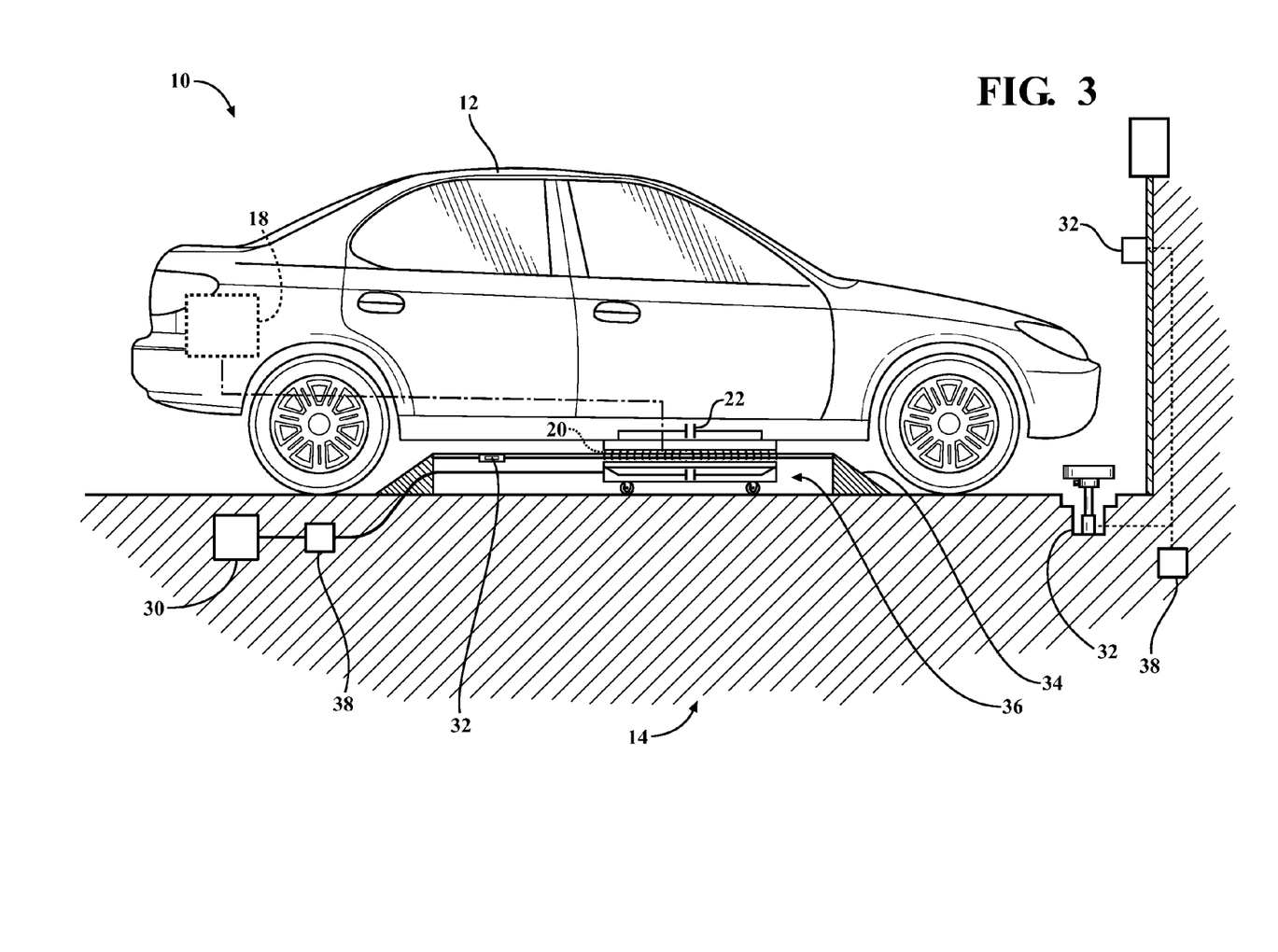
FIG. 3 is a view of an example of another charging system.
Figure 4:
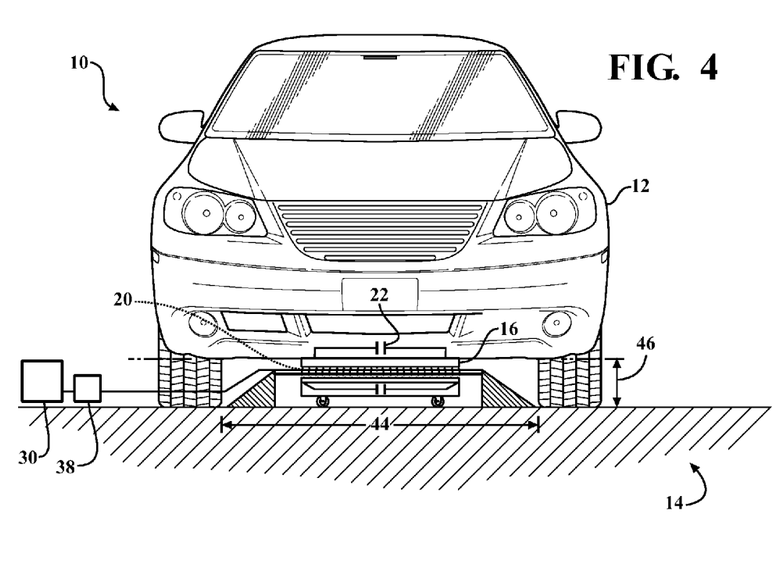
FIG. 4 is another view of the charging system of FIG. 3.

The charging station 14 can also include a housing 34. "Housing" as used herein means any structure and/or area that defines a limited range of motion for a movable charge transmitter or movable cart that is positioned or located therein. In one or more arrangements, the housing area can be isolated from the vehicle 12 itself. In one or more arrangements, the housing 34 can be a subterranean compartment, as shown in FIGS. 1-2. "Subterranean compartment" as used herein means a housing or compartment located below ground level or below the surface upon which a vehicle is supported. In one or more arrangements, the housing 34 can be a charging pad positioned at or above ground level, as shown in FIGS. 3-4.

The movement and/or position of the movable cart 24 can be confined by the housing 34. Accordingly, the movement and/or position of the movable cart 24 can be limited to an interior portion 36 of the housing 34. Also, a path that the movable cart 24 takes to arrive at the location where substantial charging alignment occurs can be restricted to the interior portion 36 of the housing 34. "Path" as used herein means one or more maneuvers that a movable cart can make to align a charge transmitter with a charge receiver. Examples of such maneuvers can include forward movements, reverse movements, lateral movements, and rotational movements about a substantially vertical axis or other axis of the movable cart. The movable cart can move both longitudinally (see FIG. 1) and laterally (see FIG. 2). Such movements are confined to the interior portion 36 of the housing 34.

In one or more arrangements, with reference to FIG. 1, the housing 34 can be, for example, formed in a sub-floor of a garage, parking structure, and/or a parking lot. The housing 34 can include bumpers (not shown) to minimize the force at which the movable cart 24 contacts the interior walls, thereby avoiding or minimizing damage sustainable to the movable cart 24. The bumpers can be made of foam, rubber, plastic, and/or any other suitable soft or shock-absorbent material. The bumpers can be positioned in any suitable location, such as around the perimeter of the interior portion 36 of the housing 34.

The housing 34 can also include a liner (not shown) for at least partially forming the housing 34. The liner can be used when installing the charging system 10 in a home garage, parking structure, or parking lot. "Liner" can be any structure used to at least partially define the housing when a charging station and/or a housing are being constructed. For instance, the liner can be used to at least partially define the housing 34 when the charging station 14 and/or the housing 34 are being constructed. For example, the liner can be made of wood, plastic, foam, metal, or any other material configured to insulate a compartment when pouring cement, gravel, sand, dirt and/or other ground materials to construct the charging station 14.

The housing 34 can include an access door (not shown). The access door can allow for maintenance and repair of the movable cart 24 within the housing 34. The access door can be positioned between the subterranean compartment shown in FIG. 1 and ambient air to allow access to the subterranean compartment. In the alternative example shown in FIG. 3, the access door can be positioned on the charging pad between ambient air and the interior portion 36 of the charging pad.

The charging station 14 can also include a processor 38. "Processor" means any component or group of components that are configured to execute any of the processes described herein or any form of instructions to carry out such processes or cause such processes to be performed. The processor 38 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 38 can include at least one hardware circuit (e.g., an integrated circuit) configured to carry out instructions contained in program code. In arrangements in which there is a plurality of processors 38, such processors can work independently from each other or one or more processors can work in combination with each other.

The charging station 14 can also include a communication device 40. "Communication device" as used herein means any component, group of components, device, and/or system that is capable of wirelessly transmitting and/or receiving data over a range of space. The communication device 40 can transmit and/or receive data via Wi-Fi, Bluetooth, RFID, Beacon technology, CDMA, LTE, 3G, 4G, and/or any other type of technology configured to wirelessly transmit and/or receive data. In one or more arrangements, there can also be a communication device 42 included in the vehicle 12.

The communication device 42 can transmit at least one identifier. "Identifier" as used herein means data indicative of a property, characteristic, status, or condition. For instance, the identifier can be the type of charge receiver, location data collected from a sensor corresponding to the location of a charge receiver relative to a charge transmitter, dimensions or size of the charge receiver, optimum voltage or current for charging a battery, data regarding whether a vehicle has been started or entered, data regarding the battery charge level, data regarding the location of the charge receiver relative to a fixed point on the vehicle identifiable by the sensors, and any other identifiers that the processor can use activate, deactivate, and/or position the movable cart within the housing.

In one or more arrangements, the communication device 42 can transmit a charge request signal. "Charge request signal" as used herein means any signal transmitted to initiate a charging process or to cause a charging process to be initiated. The charge request signal can be communicated to the processor 38. In one or more arrangements, the charge transmit signal can be transmitted responsive to the vehicle being placed in park, user input, and/or some other condition. Responsive to receiving the charge request signal, the processor 38 can alert the sensor 32 to collect data so that the relative location of the charge transmitter 26 to the charge receiver 16 can be determined.

The processor 38 can receive data from at least one source, including any of the sensors 32 directly. The communication device 42 and/or the processor 38 can transmit a target position within the interior portion 36 of the housing 34 for the movable cart 24 to achieve substantial charging alignment. "Substantial charging alignment" as used herein means the charge transmitter and charge receiver are sufficiently aligned such that sufficiently efficient charging of the vehicle battery is achieved. For instance, sufficiently efficient charging can be charging with an efficiency of 50% or more, 55% or more, 60% or more, 65% or more, 70% or more, 75% or more, 80% or more, 85% or more, 90% or more, 95% or more, just to name a few possibilities.

When the charge transmitter 26 and charge receiver 16 are in substantial charging alignment, the processor 38 can cause power to be transferred from the power source 30 to the charge transmitter 26. Alternatively, the processor 38 can send a test charge signal to the charge transmitter 26. The test charge signal can include a brief activation of the charge transmitter 26 to test the charging efficiency of the charger receiver 16. In one or more arrangements, the test charge signal can be used to compare the charging efficiency to a threshold value. If the charging efficiency is at or above the threshold, the charge transmitter 26 can remain active. However, if the charging efficiency is below the threshold, the charge transmitter 26 can be deactivated and a new target position for the movable cart 24 can be determined to achieve substantial charging alignment.

When the processor activates the charge transmitter 26, charging can be initiated between the charge transmitter 26 and charge receiver 16. Charging can include a transfer of electromagnetic energy from one source to another. In one or more arrangements, the charge transmitter 26 and charge receiver 16 can have substantially the same resonant frequency. The resonant frequency, $f_o$, of an L-C circuit can be a function of the inductance, L, and capacitance, C, according to:

$$f_o = \frac{1}{2\pi\sqrt{LC}} \quad (1)$$

The capacitive element 28 of the movable cart 24 can have an associated capacitance C, and the charge transmitter 26 can have an associated inductance L. The capacitive element 28 and the charge transmitter 26 can have a resonant frequency $f_{o1}$. Additionally, the capacitive element 22 of the vehicle 12 can have a capacitance of C', where C' can be any capacitance including C. The charge receiver 16 can have an inductance of L', where L' can be any inductance including L. Therefore, the capacitive element 22 of the vehicle 12 and the charge receiver 16 can have a resonant frequency $f_{o2}$. The charging system 10 can be configured where LC≈L'C', so that $f_{o1} \approx f_{o2}$. Therefore, the charging system 10 can be configured where the charge transmitter 26 and charge receiver 16 can be substantially in resonance with one another. However, it should be understood that arrangements described herein are not limited to the charge transmitter 26 and charge receiver 16 being in resonance.

When the charge transmitter 26 is activated, the charge transmitter 26 can output the electromagnetic field 20. In one or more arrangements, the electromagnetic field 20 can have substantially the same resonant frequency as the L-C circuit formed by the charge transmitter 26 and the capacitive element 28. The electromagnetic field 20 can interact with the charge receiver 16. In arrangements in which the charge transmitter 26 and the charge receiver 16 are substantially in resonance with each other, the charge transmitter 26 can communicate power at a greater distance than regular inductive charging without significantly compromising efficiency. The electromagnetic field 20 can induce a current in the L-C circuit formed by the charge receiver 16 and the capacitive element 22. The current induced in the L-C circuit can be communicated to the battery 18, charging the battery 18. This form of charging is known as resonance charging.

Further, the charge receiver 16 can be provided in any suitable location on the vehicle 12. For instance, as is shown in FIGS. 1-2, the charge receiver 16 can be provided in any suitable location on the underside of the vehicle 12. In one or more arrangements, the charge receiver 16 can be provided on the roof or a side of the vehicle 12. In such instances, the housing 34 can be suspended from the ceiling or positioned on the walls of the garage, parking structure, etc.

Referring now to FIGS. 3-4, another example of the charging system 10 is shown. In such a system, the housing 34 can include a charging pad positioned at or above ground level. The charging pad can include the interior portion 36. The movable cart 24 can be disposed in and limited to the interior portion 36 of the charging pad. The charging pad can be made of any suitable material. For instance, the charging pad can be made of plastic, metal, wood, foam, rubber, or any other suitable material. In one or more arrangements, the charging pad can be made of a material that can allow the electromagnetic field 20 to pass therethrough.

As shown in FIG. 3, the sensor 32 can alternatively be provided on an exterior surface of the charging pad. The sensor 32 can be oriented so that it faces toward the underside of the vehicle 12. The sensor 32 in this example can be any suitable type of sensor. For instance, the sensors 32 can be an infrared sensor or a camera sensor. The sensor 32 can capture data relating to the underside of the vehicle 12. The sensor 32 can communicate data regarding the underside of the vehicle 12 to the processor 38. The processor 38 can cause the movable cart 24 to adjust its position within the interior portion 36 to a position in which the charge transmitter 26 and the charge receiver 16 are in substantial charging alignment.

Referring to FIG. 4, the charging pad can have any suitable size. For instance, the charging pad can be sized to prevent damage to the charging pad and movable cart 24. For instance, a width of the charging pad can be less than a track 44 of the vehicle 12. The track 44 means the distance between the interior side of the two front wheels and/or the two rear wheels of the vehicle. Further, a height of the charging pad can be less than a ground clearance 46 of the vehicle 12. The ground clearance 46 means a distance between the lowest point on the undercarriage of the vehicle 12 and the ground level.

Figure 6:
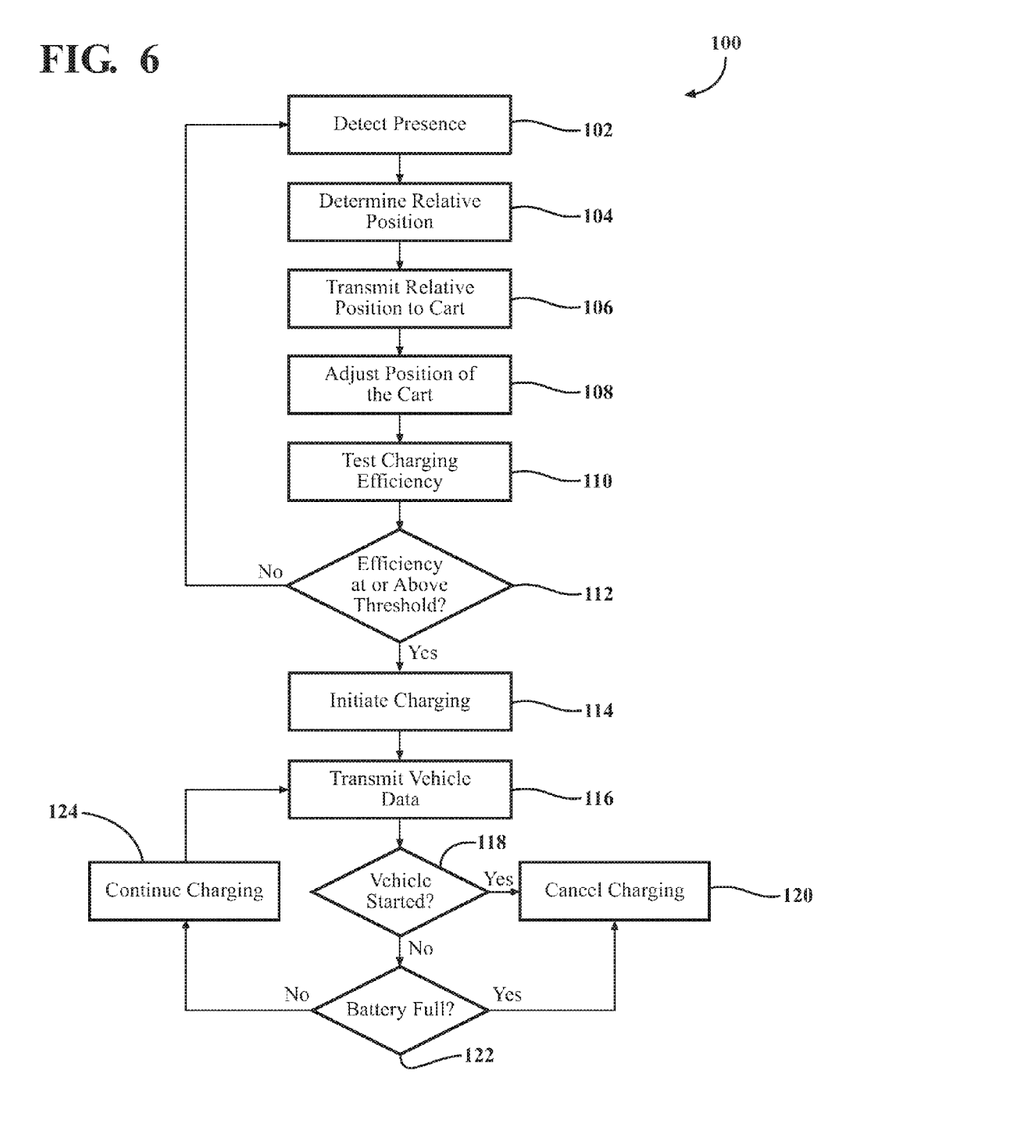
FIG. 6 is an example of a method of wirelessly charging a battery.

Now that the various potential systems, devices, elements and/or components of the system 10 have been described, various methods of wirelessly charging a battery will now be described. Referring now to FIG. 6, a method of wirelessly charging the battery 18 is shown through method 100 with reference to the structural components described above. Various possible steps of method 100 will now be described. The method 100 illustrated in FIG. 6 may be applicable to the examples described above in relation to FIGS. 1-5, but it is understood that the method 100 can be carried out with other suitable systems and arrangements. Moreover, the method 100 may include other steps that are not shown here, and in fact, the method 100 is not limited to including every step shown in FIG. 6. The steps that are illustrated here as part of the method 100 are not limited to this particular chronological order. Indeed, some of the steps may be performed in a different order than what is shown and/or at least some of the steps shown can occur simultaneously.

At block 102, the presence of the vehicle 12 within and/or near the charging station 14 can be detected. Such detecting can be performed by the sensors 32 positioned in the charging system 10. Alternatively, the presence of the vehicle 12 can be detected by receiving a signal from the vehicle 12. The method can continue to block 104.

At block 104, responsive to detecting the presence of the vehicle 12, the position of the charge receiver 16 relative to the charge transmitter 26 can be determined. Such a determination can be made by, for example, the processor 38. Such a determination can be made using any suitable method for determining a relative location between two components. For example, a determination based on heat signature or image of the bottom of the vehicle can be made by matching signatures or images with those stored in the memory of the processor 38. Such matching can also be adaptive or learnable to specific vehicles parked in this location, and matching with adaptation/learning can employ machine-learning algorithms. The method can continue to block 106.

At block 106, the relative position of the charge receiver 16 can be transmitted to the movable cart 24. Sensor data obtained at block 104 can be analyzed by the processor 38. The processor 38 can be configured to determine a relative position of the charge receiver 16 to the charge transmitter 26. The processor 38 can transmit the relative location of the charge receiver 16 to the movable cart 24. The method can continue to block 108.

At block 108, the position of the movable cart 24 can be adjusted. The movable cart 24 can be positioned in a target location in the interior portion 36 of the housing 34. In arrangements in which the charge transmitter 26 is not provided on a movable cart, the position of the charge transmitter 26 can be adjusted in any suitable manner. The position of the movable cart 24 can be adjusted to achieve substantial charging alignment between the charge transmitter 26 and the charge receiver 16. The method can continue to block 110.

At block 110, the charging system 10 can, in one or more arrangements, test the charging efficiency. Such testing can be performed in any suitable manner. For instance, the processor 38 can briefly activate the charge transmitter 26 and the voltage, current, power, or efficiency of charging can be tested. The method can continue to block 112.

At block 112, the charging system 10 can compare the tested efficiency to a threshold value. If the voltage, current, power, or efficiency is below a threshold, the method can return to block 102. If the charging efficiency is at or above the threshold, the method can continue to block 114. At block 114, the charging system 10 can initiate charging. The processor 38 can activate the charge transmitter 26. The electromagnetic field 20 can be transmitted from the charge transmitter 26 to the charge receiver 16. The electromagnetic energy received by the charge receiver 16 can be used to charge the battery 18. The method can continue to block 116.

At block 116, the vehicle 12 can transmit vehicle data. For instance, the vehicle 12 can transmit vehicle data via the communication device 42. Any suitable vehicle data can be transmitted. For instance, the vehicle data transmitted can include data regarding the battery 18 charging level and/or data regarding whether the vehicle 12 has been started. The method can continue to block 118.

At block 118, the charging system 10 can monitor the vehicle data to determine whether the vehicle has been started. If the vehicle has been started, the method can continue to block 120. At block 120, the charging system 10 can discontinue or cancel charging.

However, if the vehicle has not been started, the method can continue to block 122. At block 122, the charging system can detect whether the battery 18 is full. If the battery is not full, the method can continue to block 124. At block 124, the battery continues to charge. The method can return to block 116. If the battery 18 is full, the method can continue to block 120. As stated above, at block 120, the charging system 10 can discontinue charging. The processor 38 can deactivate the charge transmitter 26. Additionally, at block 120, the movable cart 24 can adjust its position within the housing to return to a pre-determined safe position. The pre-determined safe position can be at or near a center point of the housing 34 or along a longitudinal center-line of the housing 34. The safe position can be any suitable location in which concerns about being run over by the vehicle 12 are minimized. However, if the conditions monitored by blocks 118 and 122 are not present, the charging system 10 can continue to charge the battery 18.

Methods can include other steps that are not shown here, and in fact, methods are not limited to including every step described. Furthermore, the steps detailed here as part of the method for wirelessly charging the vehicle are not limited to this particular chronological order. Indeed, some of the steps can be performed in a different order than what is described and/or at least some of the steps can occur simultaneously.

It will be appreciated that arrangements described herein can provide numerous benefits, including one or more of the benefits mentioned herein. For example, arrangements described herein can improve the process of charging the battery of a vehicle. Arrangements described herein can reduce the burden for a driver to position a vehicle to align a vehicle charge receiver with a charge transmitter. Arrangements described herein can also reduce the likelihood of a driver forgetting to charge his or her vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle charging station comprising:
a housing;
a charge transmitter, the charge transmitter being movable within a range of motion, the range of motion being physically constrained by the housing;
an infrared sensor configured to acquire data corresponding to a presence of a vehicle at the vehicle charging station;
an actuatable sensor configured to deploy to an extended position in which a portion of the actuatable sensor extends above the housing for capturing data corresponding to an underside of the vehicle; and
a processor operatively connected to the charge transmitter, the infrared sensor, and the actuatable sensor, the processor being configured to:
detect the presence of the vehicle based on the data acquired by the infrared sensor; and
responsive to detecting the presence of the vehicle based on data acquired by the infrared sensor, perform the following:
cause the actuatable sensor to deploy to the extended position;
detect a relative location of the charge receiver located on the underside of the vehicle and the charge transmitter located in the housing based on data captured by the actuatable sensor; and
cause the position of the charge transmitter to be adjusted within the housing based on the relative location of the charge receiver located on the underside of the vehicle such that the charge transmitter and charge receiver are in substantial charging alignment, whereby the charge transmitter and charge receiver are aligned such that sufficiently efficient charging of a battery of the vehicle is achieved.

2. The vehicle charging station of claim 1, wherein the housing is a charging pad positioned at or above ground level.

3. The vehicle charging station of claim 1, wherein the housing is a subterranean compartment.

4. A system for wirelessly charging a vehicle carrying a charge receiver, comprising:
a charging station including:
a housing;
a cart movable within the housing and carrying a charge transmitter;
an infrared sensor configured to detect and transmit data corresponding to a presence of a vehicle carrying a charge receiver at the charging station;
a pneumatic sensor configured to:
deploy to an extended position above the housing from a retracted position and,
while the pneumatic sensor is in the extended position, detect and communicate data relating to an underside of the vehicle; and
a processor operatively connected to the infrared sensor, the pneumatic sensor and the cart, the processor being configured to:
cause the pneumatic sensor to deploy to the extended position responsive to determining, based on the data received from the infrared sensor, the vehicle carrying the charge receiver is present at the charging station;
analyze the data relating to the underside of the vehicle to detect a relative location of the charge receiver; and
cause the position of the cart to be adjusted within the housing based on the relative location of the charge receiver to achieve substantial charging alignment between the charge transmitter and charge receiver, whereby the charge transmitter and charge receiver are aligned such that sufficiently efficient charging of a battery of the vehicle is achieved.

5. The system of claim 4, wherein the housing is a charging pad positioned at or above ground level.

6. The system of claim 4, wherein the housing is a subterranean compartment.

7. A method of wirelessly charging a vehicle, the method comprising:
detecting a presence of a charge receiver on a vehicle based on data received from an infrared sensor configured to acquire data corresponding to the presence of the vehicle;

responsive to the presence of the vehicle being detected based on data received from the infrared sensor, perform the following:

deploying an actuatable sensor to an extended position in which a portion of the actuatable sensor extends above a housing, the housing including a charge transmitter;

acquiring, using the actuatable sensor, data corresponding to an underside of the vehicle;

determining a relative location position of the charge receiver located on the underside of the vehicle and the charge transmitter included in the housing based on the data acquired by the actuatable sensor;

adjusting the position of the charge transmitter within the housing based on the relative location of the charge receiver to achieve substantial charging alignment between the charge transmitter and charge receiver, whereby the charge transmitter and charge receiver are aligned such that sufficiently efficient charging of a battery of the vehicle is achieved determined position of the charge receiver, the movement of the charge transmitter being constrained by the housing; and activating the charge transmitter to transmit an electromagnetic field at least partially toward the charge receiver.

8. The method of claim 7, further including:
detecting whether the vehicle has been started; and
responsive to detecting that the vehicle has been started, deactivating the charge transmitter.

9. The method of claim 7, further including:
detecting whether the battery of the vehicle is fully charged; and
responsive to detecting that the battery of the vehicle is fully charged, deactivating the charge transmitter.

10. The vehicle charging station of claim 1, wherein the actuatable sensor is deployed pneumatically.

11. The vehicle charging station of claim 1, wherein the actuatable sensor extends upwardly above the housing.

12. The vehicle charging station of claim 11, wherein the actuatable sensor telescopically extends upwardly above the housing.

13. The vehicle charging station of claim 1, wherein the actuatable sensor is further configured to rotate while in the extended position.

14. The vehicle charging station of claim 1, wherein the housing is positioned beneath ground level, and wherein the actuatable sensor is configured to deploy to the extended position where the portion of the actuatable sensor is located at or above ground level.

15. The vehicle charging station of claim 1, wherein the actuatable sensor is maintained in a retracted position when the presence of the charge receiver is not detected.

* * * * *

UNITED STATES PATENT AND TRADEMARK OFFICE
CERTIFICATE OF CORRECTION

PATENT NO.         : 9,908,425 B2
APPLICATION NO.    : 14/789010
DATED              : March 6, 2018
INVENTOR(S)        : Danil V. Prokhorov

Page 1 of 1

It is certified that error appears in the above-identified patent and that said Letters Patent is hereby corrected as shown below:

In the Claims

Claim 1, Column 14, Line 8: delete "the" and insert --a--.

Signed and Sealed this
Twelfth Day of June, 2018

Andrei Iancu
*Director of the United States Patent and Trademark Office*